United States Patent
Zeng

(10) Patent No.: US 9,090,263 B2
(45) Date of Patent: Jul. 28, 2015

(54) LANE FUSION SYSTEM USING FORWARD-VIEW AND REAR-VIEW CAMERAS

(75) Inventor: Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 966 days.

(21) Appl. No.: 12/840,069

(22) Filed: Jul. 20, 2010

(65) Prior Publication Data

US 2012/0062747 A1 Mar. 15, 2012

(51) Int. Cl.
*H04N 7/18* (2006.01)
*B60W 40/06* (2012.01)
*G06K 9/00* (2006.01)

(52) U.S. Cl.
CPC .......... *B60W 40/06* (2013.01); *G06K 9/00798* (2013.01); *B60W 2550/146* (2013.01)

(58) Field of Classification Search
USPC ........................................................ 348/149
See application file for complete search history.

(56) References Cited

U.S. PATENT DOCUMENTS

| | | | |
|---|---|---|---|
| 5,351,044 A * | 9/1994 | Mathur et al. ................. | 340/901 |
| 6,718,259 B1 * | 4/2004 | Khosla ........................... | 701/536 |
| 6,930,593 B2 | 8/2005 | Crawshaw | |
| 2002/0021243 A1 * | 2/2002 | Speyer et al. ............ | 342/357.11 |
| 2003/0048357 A1 * | 3/2003 | Kain et al. .................... | 348/144 |
| 2004/0164851 A1 * | 8/2004 | Crawshaw .................... | 340/435 |
| 2005/0206142 A1 * | 9/2005 | Prakah-Asante et al. ..... | 280/735 |
| 2006/0251297 A1 * | 11/2006 | Hammoud et al. ........... | 382/118 |
| 2007/0255480 A1 * | 11/2007 | Southall et al. ................ | 701/96 |
| 2009/0295922 A1 * | 12/2009 | Mori ............................. | 348/148 |
| 2010/0060643 A1 * | 3/2010 | Kolipaka et al. ............. | 345/440 |
| 2010/0097455 A1 * | 4/2010 | Zhang et al. .................. | 348/119 |
| 2010/0104137 A1 * | 4/2010 | Zhang et al. .................. | 382/104 |
| 2010/0104199 A1 * | 4/2010 | Zhang et al. .................. | 382/199 |
| 2011/0169957 A1 * | 7/2011 | Bartz ............................. | 348/149 |
| 2011/0190972 A1 * | 8/2011 | Timmons et al. .............. | 701/29 |
| 2011/0282581 A1 * | 11/2011 | Zeng ............................ | 701/301 |
| 2011/0285848 A1 * | 11/2011 | Han et al. ..................... | 348/148 |

* cited by examiner

*Primary Examiner* — Angela Nguyen
(74) *Attorney, Agent, or Firm* — John A. Miller; Miller IP Group, PLC

(57) ABSTRACT

A method and system for computing lane curvature and a host vehicle's position and orientation relative to lane boundaries, using image data from forward-view and rear-view cameras and vehicle dynamics sensors as input. A host vehicle includes cameras at the front and rear, which can be used to detect lane boundaries such as curbs and lane stripes, among other purposes. The host vehicle also includes vehicle dynamics sensors including vehicle speed and yaw rate. A method is developed which computes lane curvature and the host vehicle's position relative to a lane reference path, where the lane reference path is derived from the lane boundaries extracted from a fusion of the front and rear camera images. Mathematical models provided in the disclosure include a Kalman filter tracking routine and a particle filter tracking routine.

19 Claims, 6 Drawing Sheets

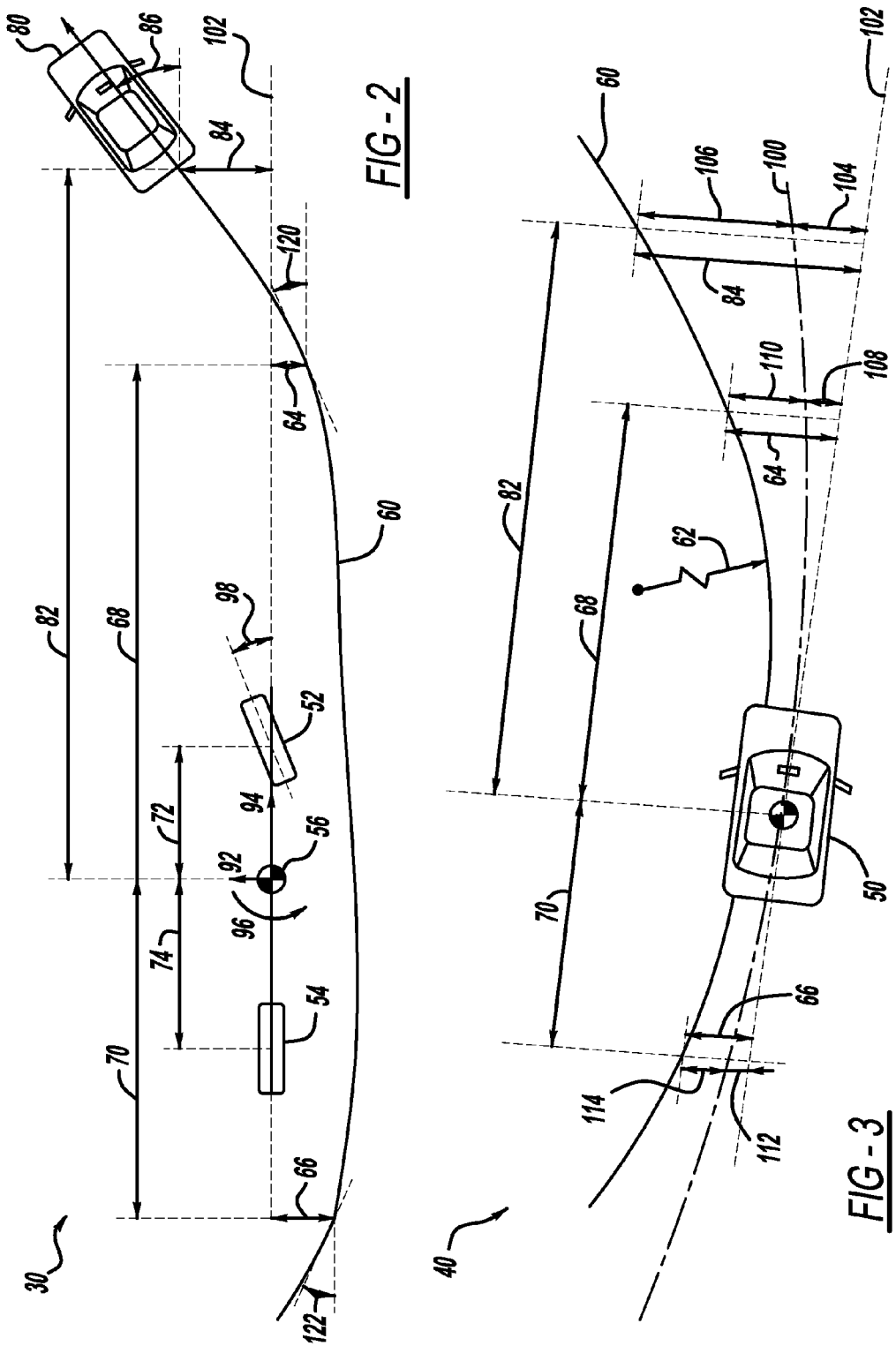

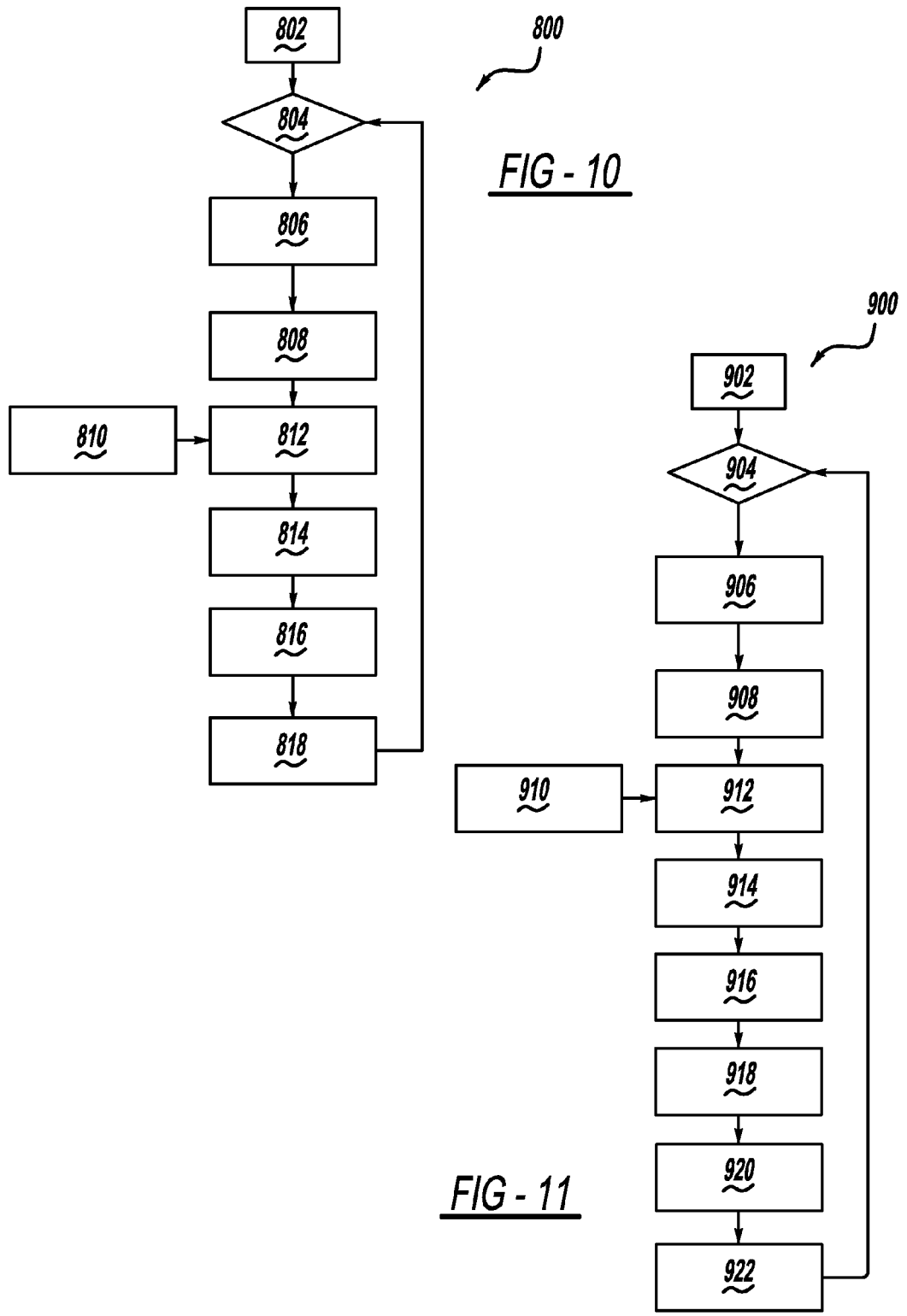

LANE FUSION SYSTEM USING FORWARD-VIEW AND REAR-VIEW CAMERAS

BACKGROUND OF THE INVENTION

1. Field of the Invention

This invention relates generally to a lane position method and system for a vehicle and, more particularly, to a lane position method and system for a host vehicle which uses a fusion of image data from forward-view and rear-view cameras and data from vehicle dynamics sensors to compute lane parameters, including lane curvature and the host vehicle's position and orientation relative to a lane reference path.

2. Discussion of the Related Art

Many modern vehicles include onboard cameras, which are used for a variety of purposes. One common application is a forward-viewing camera which can provide images to be used in a collision avoidance system, a lane departure warning system, a lateral control system, or a combination of these or other systems. However, conditions may arise which prevent a good image from being obtained from the forward-viewing camera. Such conditions include a leading vehicle at close range which blocks much of the camera's field of view, and low-visibility weather conditions, such as rain and fog, which obscure the camera's image. In such conditions, when a usable image from the forward-view camera is not available, systems which rely on the camera's image for input cannot be operated.

Meanwhile, many newer vehicles are also equipped with a rear-view camera, which is normally used only for backup assistance, such as providing a video image for the driver to see what is behind the vehicle. Although these rear-view cameras typically have a resolution and field of view which are more than sufficient for other image data collection purposes, until now they have not been used to supplement the images from forward-view cameras for lane position and lateral control applications.

There is an opportunity to use the image data available from a rear-view camera, and combine it with image data from a forward-view camera and other sensors, to provide a more robust lane sensing system. The resultant two-camera system not only makes use of more input data under normal conditions, but also provides a usable source of image data to allow operation of the system when conditions are unfavorable for forward-view imaging.

SUMMARY OF THE INVENTION

In accordance with the teachings of the present invention, a method and system are disclosed for computing lane curvature and a host vehicle's position and orientation relative to lane boundaries, using image data from forward-view and rear-view cameras and vehicle dynamics sensors as input. A host vehicle includes cameras at the front and rear, which can be used to detect lane boundaries such as curbs and lane stripes, among other purposes. The host vehicle also includes vehicle dynamics sensors including vehicle speed and yaw rate. A method is developed which computes lane curvature and the host vehicle's position relative to a lane reference path, where the lane reference path is derived from the lane boundaries extracted from a fusion of the front and rear camera images. Mathematical models provided in the disclosure include a Kalman filter tracking routine and a particle filter tracking routine.

Additional features of the present invention will become apparent from the following description and appended claims, taken in conjunction with the accompanying drawings.

BRIEF DESCRIPTION OF THE DRAWINGS

FIG. 2 is a diagram of a bicycle model for lateral control of a host vehicle;

FIG. 3 is a diagram of the host vehicle showing many of the key parameters of the lateral control model;

FIG. 10 is a flow chart diagram of the Kalman filter tracking method used in the lane tracking module of FIG. 7; and FIG. 11 is a flow chart diagram of the particle filter tracking method used in the lane tracking module of FIG. 7.

DETAILED DESCRIPTION OF THE EMBODIMENTS

The following discussion of the embodiments of the invention directed to a lane fusion system using forward-view and rear-view cameras is merely exemplary in nature, and is in no way intended to limit the invention or its applications or uses.

Many modern vehicles include forward-view cameras, and systems which use the image data from the forward-view cameras in applications such as lane departure warning and lateral control assistance. However, images from forward-view cameras can be obstructed by a leading vehicle, or obscured by sun glare, fog, rain, or snow, which reduces the reliability of applications which would rely on the images. Given the increasing availability of rear-view cameras, often used primarily for backup assistance, it makes sense to use the rear-view camera image data as a supplement to the forward-view camera image data. Along with GPS and digital map data, vehicle dynamics sensors, and radar-based or other systems capable of detecting a vehicle on the road ahead of the host vehicle, the forward-view and rear-view camera image data can be used in advanced applications for improved safety and vehicle control.

Figure 1:
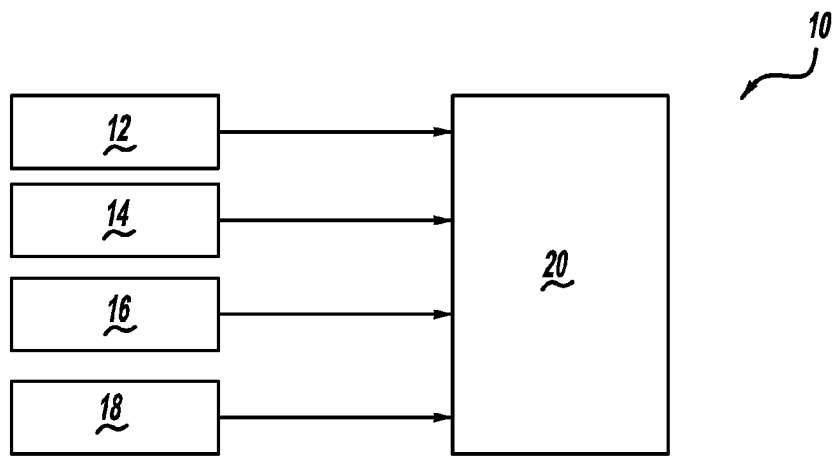
FIG. 1 is a block diagram of a vehicle lateral control system which uses front and rear cameras and other sources of input.

In one approach, the data sources are used directly in a vehicle lateral control application. FIG. 1 is a block diagram of a system 10 for lateral control of a vehicle using forward-view and rear-view cameras and other data sources. The system 10 uses image data from a forward-view camera 12 and a rear-view camera 14, as will be discussed below. A leading vehicle position system 16, which may be a long range radar (LRR) or other type system, tracks the position of a leading vehicle, for the purpose of estimating the path of the roadway. Road curvature information from a GPS-based navigation system or digital map 18 provides another source of data for the system 10. The inputs from the forward-view camera 12, the rear-view camera 14, the leading vehicle position system 16, and the digital map 18 are all used by a vehicle lateral control module 20, the operation of which will be discussed in detail below.

FIG. 2 is a diagram of a bicycle model 30 for vehicle lateral control, which is obtained by combining the two wheels of each axle into one wheel at the centerline of the vehicle. FIG. 3 is a diagram of a control model 40 which adds more detail to the bicycle model 30. Like elements and dimensions share the same reference numerals in FIGS. 2 and 3, which will be discussed together. The following table is provided as an index of the items and dimensions shown in FIGS. 2 and 3, including their reference numbers and descriptions.

| Ref # | Symbol | Description |
|---|---|---|
| 30 | n/a | bicycle model |
| 40 | n/a | control model |
| 50 | n/a | host vehicle |
| 52 | n/a | front tire |
| 54 | n/a | rear tire |
| 56 | n/a | center of gravity point |
| 60 | n/a | lane reference path |
| 62 | $\kappa$ | lane curvature |
| 64 | $\Delta y_F$ | front lateral displacement |
| 66 | $\Delta y_T$ | rear lateral displacement |
| 68 | $d_F$ | longitudinal distance in front of center of gravity |
| 70 | $d_T$ | longitudinal distance behind center of gravity |
| 72 | $l_F$ | distance of front axle from center of gravity |
| 74 | $l_T$ | distance of rear axle from center of gravity |
| 80 | n/a | leading target vehicle |
| 82 | $X_O$ | forward distance of leading target vehicle from center of gravity of host vehicle |
| 84 | $Y_O$ | lateral distance of leading target vehicle from center of gravity of host vehicle |
| 86 | $\theta_O$ | heading angle of leading target vehicle with respect to host vehicle |
| 92 | $v_{yH}$ | host vehicle lateral velocity |
| 94 | $v_{xH}$ | host vehicle longitudinal velocity |
| 96 | $\omega_H$ | host vehicle yaw rate |
| 98 | $\delta_F$ | front wheel steering angle |
| 100 | n/a | vehicle path |
| 102 | n/a | heading line |
| 104 | $\alpha_O$ | lateral offset between the heading line and the vehicle path at forward distance 82 |
| 106 | $\epsilon_O$ | lateral offset between the vehicle path and the lane reference path at forward distance 82 |
| 108 | $\alpha_F$ | lateral offset between the heading line and the vehicle path at forward distance 68 |
| 110 | $\epsilon_F$ | lateral offset between the vehicle path and the lane reference path at forward distance 68 |
| 112 | $\alpha_T$ | lateral offset between the heading line and the vehicle path at rearward distance 70 |
| 114 | $\epsilon_T$ | lateral offset between the vehicle path and the lane reference path at rearward distance 70 |
| 120 | $\theta_F$ | vehicle orientation angle with respect to tangent to lane reference path at forward distance 68 |
| 122 | $\theta_T$ | vehicle orientation angle with respect to tangent to lane reference path at rearward distance 70 |

A host vehicle 50 is the subject of the bicycle model 30 and the control model 40, used in the vehicle lateral control module 20. The host vehicle 50 is represented by a front tire 52, a rear tire 54, and a center of gravity point 56 in the bicycle model 30. The host vehicle 50 is assumed to be equipped with a yaw rate sensor (not shown), and other sensors as necessary to know its longitudinal and lateral velocity.

A lane reference path 60 is assumed to be the centerline of a circular lane path with curvature $\kappa$, an estimate of which comes from the digital map 18. For the augmented lateral control system as considered in the bicycle model 30, the lateral displacement of the host vehicle 50 from the lane reference path 60 is measured both as a front lateral displacement $\Delta y_F$ and a tail lateral displacement $\Delta y_T$ by the forward-view camera 12 and the rear-view camera 14, respectively.

The displacement measurements are acquired by the cameras at a longitudinal distance $d_F$ in front of the center of gravity point 56 and a distance $d_T$ behind the center of gravity point 56. The distances $d_F$ and $d_T$ are time variant and dependent on the quality of lane markers detected by the cameras 12 and 14, occlusion by leading or following vehicles, and lighting conditions.

The leading vehicle position system 16 onboard the host vehicle 50 can detect a leading target vehicle 80, and provide its longitudinal distance $X_O$, lateral distance $Y_O$, and heading angle $\theta_O$. Only a vehicle immediately in front of the host vehicle 50 and within a distance threshold (e.g., 50 m) is considered as the leading target vehicle 80. Other vehicle parameters in the bicycle model 30 are distances $l_F$ and $l_T$ of the front and rear axles, respectively, from the center of gravity point 56. Three host vehicle state variables are also shown: vehicle lateral velocity $v_{yH}$ vehicle longitudinal velocity $v_{xH}$, and vehicle yaw rate $\omega_H$. A front wheel steering angle $\delta_F$ is the input of the automatic steering system as commanded by the lateral control system 20.

A vehicle path 100 describes the path the host vehicle 50 is currently following, and a heading line 102 represents a straight line through the centerline of the host vehicle 50. Distance $\alpha_O$ is the lateral offset between the heading line 102 and the vehicle path 100 at the forward distance $X_O$. Distance $\epsilon_O$ is the lateral offset between the vehicle path 100 and the lane reference path 60 at the forward distance $X_O$. Distance $\alpha_F$ is the lateral offset between the heading line 102 and the vehicle path 100 at the forward distance $d_F$. Distance $\epsilon_F$ is the lateral offset between the vehicle path 100 and the lane reference path 60 at the forward distance $d_F$. Distance $\alpha_T$ is the lateral offset between the heading line 102 and the vehicle path 100 at the rearward distance $d_T$. Distance $\epsilon_T$ is the lateral offset between the vehicle path 100 and the lane reference path 60 at the rearward distance of $d_T$.

Vehicle orientation with respect to the lane reference path tangent at the forward distance $d_F$ is represented by angle $\theta_F$, and vehicle orientation with respect to the lane reference path tangent at the rearward distance $d_T$ is represented by angle $\theta_T$.

In addition to the elements and dimensions shown in the bicycle model 30 and the control model 40, the following symbols must also be defined: m=Total mass of the host vehicle 50; $I_\omega$=Total inertia of the host vehicle 50 around the center of gravity point 56; l=Distance between the front and rear axles, (l=$l_F$+$l_T$); and $c_F$, $c_T$=Cornering stiffness of the front and rear tires, 52 and 54, respectively.

A linearized bicycle state-space model of the lateral vehicle dynamics can be written as:

$$\begin{bmatrix} \dot{v}_{yH} \\ \dot{\omega}_H \end{bmatrix} = \begin{bmatrix} -\dfrac{c_F+c_T}{mv_{xH}} & \dfrac{c_T l_T - c_F l_F}{mv_{xH}} - v_{xH} \\ \dfrac{-l_F c_F + l_T c_T}{I_\omega v_{xH}} & -\dfrac{l_F^2 c_F + l_T^2 c_T}{I_\omega v_{xH}} \end{bmatrix} \begin{bmatrix} v_{yH} \\ \omega_H \end{bmatrix} + \begin{bmatrix} \dfrac{c_F}{m} \\ \dfrac{l_F c_F}{I_\omega} \end{bmatrix} \delta_F \quad (1)$$

The state-space equations capturing the evolution of the forward-view camera measurements due to the motion of the host vehicle 50 and changes in the road geometry are:

$$\Delta \dot{y}_F = v_{xH} \theta_F - v_{yH} - \omega_H d_F \quad (2)$$

$$\dot{\theta}_F = v_{xH} \kappa - \omega_H \quad (3)$$

Similarly, the state-space equations capturing the evolution of the rear-view camera measurements due to the motion of the host vehicle 50 and changes in the road geometry are:

$$\Delta \dot{y}_T = v_{xH} \theta_T - v_{yH} + \omega_H d_T \quad (4)$$

$$\dot{\theta}_T = v_{xH} \kappa - \omega_H \quad (5)$$

It is assumed that the leading target vehicle 80 is following the centerline of the lane reference path 60, thus the state-space equations capturing the evolution of the radar measurements due to the motion of the host vehicle 50 and changes in the road geometry are:

$$\dot{Y}_O = v_{xH}\theta_O - v_{yH} - \omega_H X_O \qquad (6)$$

$$\dot{\theta}_O = v_{xH}\kappa - \omega_H \qquad (7)$$

The vehicle lateral dynamics, front camera dynamics, rear camera dynamics, and leading target vehicle dynamics described in Equations (1)-(7) can then be combined into a single dynamic system of the form:

$$\begin{bmatrix} \dot{v}_{yH} \\ \dot{\omega}_H \\ \Delta \dot{y}_F \\ \dot{\theta}_F \\ \Delta \dot{y}_T \\ \dot{\theta}_T \\ \dot{Y}_O \\ \dot{\theta}_O \end{bmatrix} = \begin{bmatrix} -\frac{c_F+c_T}{mv_{xH}} & \frac{c_Tl_T-c_Fl_F}{mv_{xH}}-v_{xH} & 0 & 0 & 0 & 0 & 0 & 0 \\ \frac{-l_Fc_F+l_Tc_T}{I_\omega v_{xH}} & -\frac{l_F^2c_F+l_T^2c_T}{I_\omega v_{xH}} & 0 & 0 & 0 & 0 & 0 & 0 \\ -1 & -d_F & 0 & v_{xH} & 0 & 0 & 0 & 0 \\ 0 & -1 & 0 & 0 & 0 & 0 & 0 & 0 \\ -1 & d_T & 0 & 0 & 0 & v_{xH} & 0 & 0 \\ 0 & -1 & 0 & 0 & 0 & 0 & 0 & 0 \\ -1 & -X_O & 0 & 0 & 0 & 0 & 0 & v_{xH} \\ 0 & -1 & 0 & 0 & 0 & 0 & 0 & 0 \end{bmatrix} \begin{bmatrix} v_{yH} \\ \omega_H \\ \Delta y_F \\ \theta_F \\ \Delta y_T \\ \theta_T \\ Y_O \\ \theta_O \end{bmatrix} + \begin{bmatrix} \frac{c_F}{m} \\ \frac{l_Fc_F}{I_\omega} \\ 0 \\ 0 \\ 0 \\ 0 \\ 0 \\ 0 \end{bmatrix} \delta_F + \begin{bmatrix} 0 \\ 0 \\ 0 \\ v_{xH}\kappa \\ 0 \\ v_{xH}\kappa \\ 0 \\ v_{xH}\kappa \end{bmatrix}$$

or in short as:

$$\dot{x} = f(x) + g(\delta_F) \qquad (8)$$

Let $y = [\dot{\omega}_H \, \Delta \dot{y}_F \, \dot{\theta}_F \, \Delta \dot{y}_T \, \dot{\theta}_T \, \dot{Y}_O \, \dot{\theta}_O]^T$ denote the output of the dynamic system, observed by the yaw rate sensor, the forward-view camera 12, the rear-view camera 14, and the leading vehicle position system 16. The observation equation can be written as $y = o(x)$.

Referring to the lane reference path 60 and the vehicle path 100 of FIG. 3, the goal of the lateral control module 20 is to track the roadway by regulating the lateral differences between the lane reference path 60 (i.e., $\Delta y_F$, $\Delta y_T$ and $Y_O$) and the vehicle path 100 (i.e., $\alpha_F$, $\alpha_T$, and $\alpha_O$) at distances of $d_F$, $d_T$, and $X_O$, measured by the forward-view camera 12, the rear-view camera 14, and the leading vehicle position system 16, respectively. Namely, the control objective is to minimize:

$$J = w_F \epsilon_F - w_T \epsilon_T + w_O \epsilon_O \qquad (9)$$

where $\epsilon_F = \Delta y_F - \alpha_F$, $\epsilon_T = \Delta y_T - \alpha_T$, and $\epsilon_O = Y_O - \alpha_O$; and $w_F$, $w_T$, and $w_O$ are normalized positive weights such that $w_F + w_T + w_O = 1$.

Equation (9) can then be written as:

$$J = h(x) \qquad (10)$$

Feedback linearization is a common approach used in controlling nonlinear system. The approach involves coming up with a transformation of the nonlinear system into an equivalent linear system through a change of variables and a suitable control input. The application of this technique to the bicycle model 30 is not linearization since the bicycle model 30 is already linear. But this technique can be applied to render the bicycle model 30 independent of the host vehicle longitudinal velocity $v_{xH}$.

The control law required to linearize the system expressed in Equations (8) and (10) by differentiating Equation (10) twice with respect to time is as follows:

$$\delta_F = \frac{1}{L_g L_f^2 h(x)}(-L_f^2 h(x) + u) \qquad (11)$$

where $L^i_f$ denotes the i-th Lie derivative along function $f$. A Lie derivative evaluates the change of one vector field along the flow of another vector field, as is known to those skilled in the art of mathematics.

Employing this control law yields a second order equation of the form $\ddot{J} = u$. Let $z_1 = J$. The resulting simplified dynamic system can be expressed as:

$$\dot{z}_1 = z_2$$

$$\dot{z}_2 = u \qquad (12)$$

Using the following state feedback control law:

$$u = -k_1 z_1 - k_2 z_2 \qquad (13)$$

the second order system Equation (12) can be written as $\dot{z} = Az$, with $$A = \begin{bmatrix} 0 & 1 \\ k_1 & k_2 \end{bmatrix}.$$

Therefore, with appropriate choice of $k_1$ and $k_2$, a stable lane tracking system can be designed with the eigenvector of A in the open left half of the complex plane.

As shown in FIG. 1, the digital map 18 provides input to the lateral control module 20, including an estimate of the lane curvature $\kappa$, which can be used as part of a feed-forward control strategy. By letting $[\dot{v}_{yH} \, \dot{\omega}_H \, \Delta \dot{y}_F \, \dot{\theta}_F]^T = 0$, the steering input, $\delta_{fwd}$, that tracks a lane curvature $\kappa$ can be computed from Equations (1)-(3) as:

$$\delta_{fwd} = \kappa \left( l - \frac{(l_F c_F - l_T c_T) v_{xH}^2 m}{c_T c_F l} \right) \qquad (14)$$

This feed-forward component of Equation (14) can be added to the above derived control law in Equations (11) and (13) to improve the transient behavior of the host vehicle 50 when entering and exiting curves.

Figure 4:
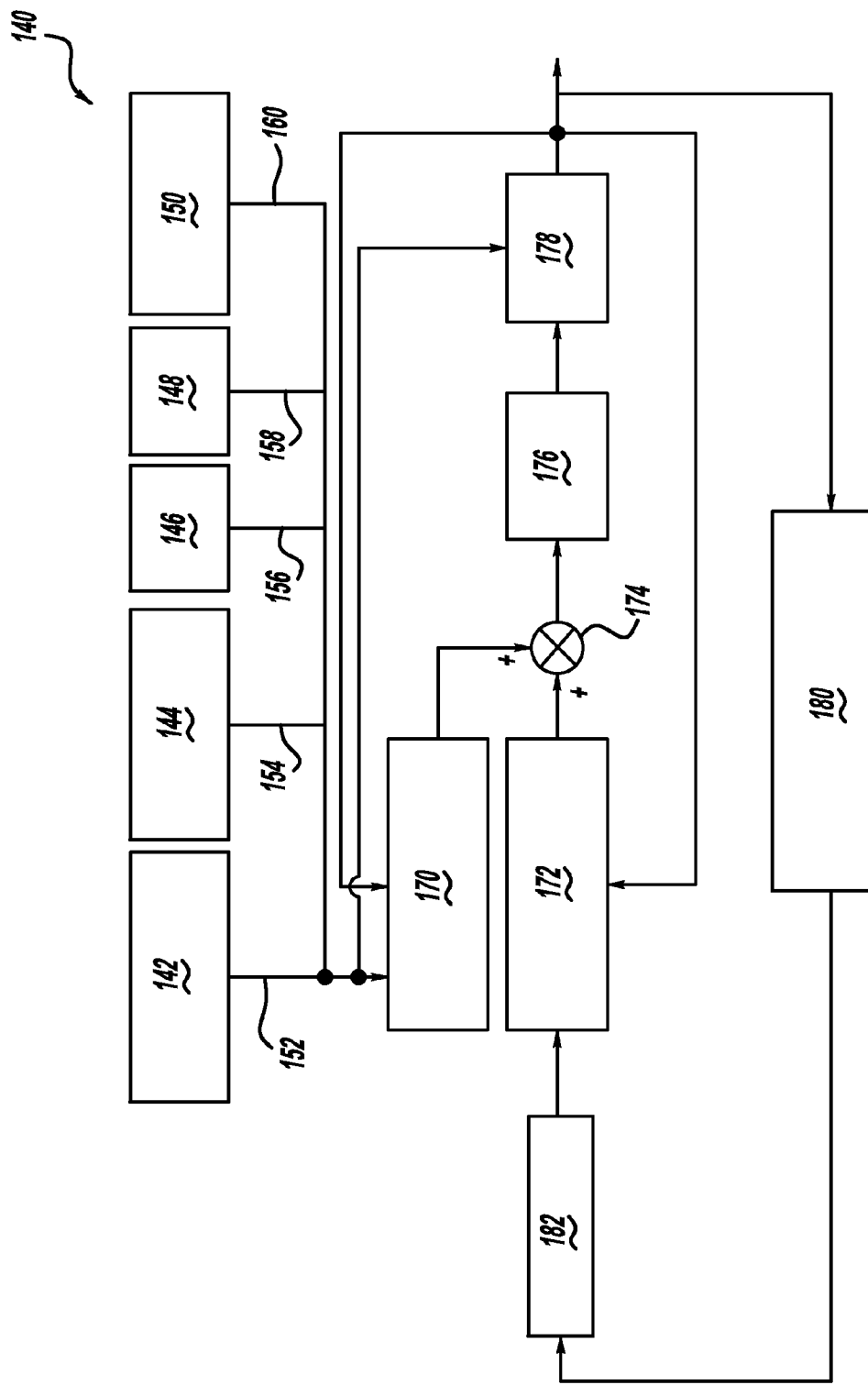
FIG. 4 is a control block diagram showing how the vehicle lateral control model is implemented.

FIG. 4 is a control block diagram 140 which shows how the vehicle lateral control strategy described above is implemented. The steps in the control method are outlined as follows:

1) At box 142, the digital map 18 provides an estimate of the lane curvature $\kappa$ on line 152.
2) At box 144, vehicle dynamics sensors provide the vehicle forward velocity $v_{xH}$ and yaw rate $\omega_H$ measurements on line 154.
3) At box 146, the forward-view camera 12 provides measurements of the lane orientation $\theta_F$, the lateral displacement $\Delta y_F$, and the longitudinal distance where the measurement is taken $d_F$, on line 156.
4) At box 148, the rear-view camera 14 provides measurements of the lane orientation $\theta_T$, the lateral displacement $\Delta y_T$, and the longitudinal distance where the measurement is taken $d_T$, on line 158.
5) At box 150, the leading vehicle position system 16 provides leading target vehicle position, i.e., the longitudinal offset $X_O$, the lateral offset $Y_O$, and the heading $\theta_O$, on line 160.
6) The inputs on the lines 152-160 are provided to box 170, where the feed-forward term $\delta_{fwd}$ is computed as in Equation (14).
7) At box 172, the feedback linearization term $\delta_F$, is computed as in Equation (11).
8) At summing junction 174, the feed-forward term $\delta_{fwd}$ and the feedback linearization term $\delta_F$, are added together, and sent to a steering actuator (electric power steering, or other type system) in the host vehicle 50 at box 176.
9) At box 178, an Observer module estimates the vehicle's state variables using a Kalman filter, with the data on the lines 152-160 and the vehicle's response as inputs, using Equation (8) and y=o(x).
10) At box 180, a variable change module computes $z_1$ and $z_2$ using Equations (10) and (12).
11) At box 182, the feedback term u is computed for the linearized dynamic system using Equation (12).

Some examples are provided to further explain the operation of the control method described above. In the best case scenario, measurements from all three external sensors are available; that is, rearward lane boundary information from the rear-view camera 14, forward lane boundary information from the forward-view camera 12, and leading vehicle information from the leading vehicle position system 16. In such a case, the weight parameters in Equation (9) are defined to be proportional to the quality of the measurement (i.e., signal-noise ratio, or variance of the estimates) returned by the corresponding sensors. For example, let measurement variances of the forward-view camera 12, the rear-view camera 14, and the leading vehicle position system 16 be $\sigma_F$, $\sigma_T$, and $\sigma_O$, respectively. Then the corresponding weights are computed as:

$$w_F = Ce^{-\frac{\sigma_F^2}{W}}, \quad w_T = Ce^{-\frac{\sigma_T^2}{W}}, \quad w_O = Ce^{-\frac{\sigma_O^2}{W}} \quad (15)$$

where C is the normalization parameter such that $w_F+w_T+w_O=1$, and W is a bandwidth parameter chosen by the designer.

In a situation where the leading target vehicle 80 blocks the view of the forward-view camera 12, such that little or no forward lane boundary information is available, the weight parameters of Equation (9) would be tuned by decreasing the value of $w_F$ (possibly to zero), and increasing the values of $w_T$ and $w_O$. Similarly, in a situation where there is no suitable leading target vehicle 80, the value of $w_O$ would be set to zero, and the values of $w_F$ and $w_T$ would be increased. Finally, in a situation where a low-angle sun or inclement weather obscures the image from the forward-view camera 12, such that no forward lane boundary information is available, the weight parameters of Equation (9) would be tuned by setting the value of $w_F$ to zero, and increasing the values of $w_T$ and $w_O$.

Using the control method described above, a robust vehicle lateral control system can be implemented. By directly using front and rear camera images as input, along with other indicators of road curvature, the lateral control system can provide more reliable and stable performance than lateral control systems which do not use as many sources of input.

Another approach to vehicular lateral control can be achieved by first combining the data from the forward-view camera 12 and the rear-view camera 14 in a data fusion module, and then using the resultant lane curvature and displacement information from the fusion module in a lateral control module.

Figure 5:
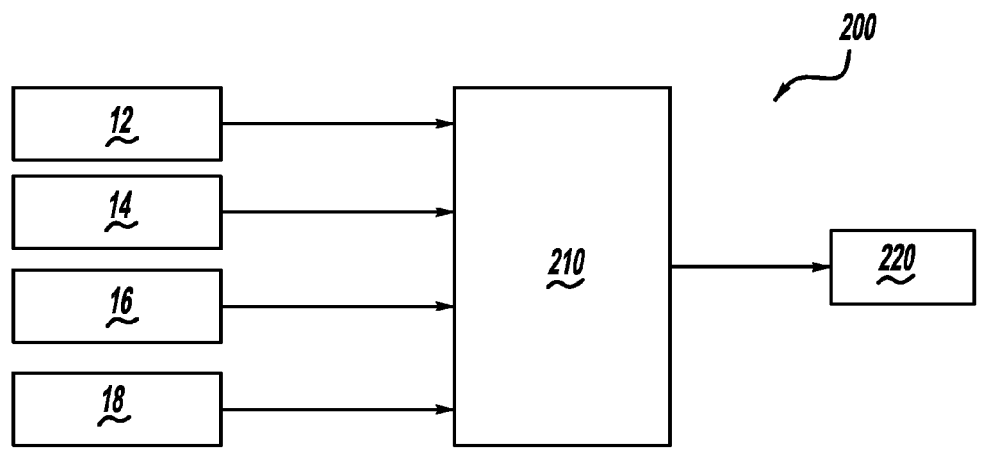
FIG. 5 is a block diagram of a system for vehicle lateral control using a 2-camera lane fusion approach.

FIG. 5 is a block diagram of a system 200 for vehicle lateral control using a 2-camera lane fusion approach. Like the system 10 shown in FIG. 1, the system 200 uses data from the forward-view camera 12, the rear-view camera 14, the leading vehicle position system 16, and the digital map 18. However, unlike the system 10 which uses the inputs directly in the lateral control module 20, the system 200 first combines the inputs in a data fusion module 210. The outputs of the data fusion module 210, including roadway curvature, and the vehicle's displacement and orientation relative to lane boundaries, are then provided to a vehicle lateral control module 220. The outputs of the data fusion module 210 may also be used in applications other than a lateral control system, such as a lane departure warning system.

Two methods of performing lane data fusion will be discussed below. In this discussion, many of the variables and dimensions from FIGS. 2 and 3 will be referenced.

A traditional lane information system with lane departure warning typically includes the forward-view camera 12 that can measure the vehicle orientation with respect to the tangent of the lane $\theta_F$ at the front, the front lateral displacement $\Delta y_F$ at the front bumper, and the lane curvature κ, where the distance $d_F$ is defined as the distance from the center of gravity point 56 to the front bumper of the host vehicle 50. Besides the functionality providing backup assistance, the rear-view camera 14 can offer additional lane sensing measurements; the vehicle orientation with respect to the tangent of the lane $\theta_T$ at the rear, and the rear lateral displacement $\Delta y_T$ at the rear bumper, where the distance $d_T$ is defined as the distance from the center of gravity point 56 to the rear bumper of the host vehicle 50. The two additional camera measurements, $\theta_T$ and $\Delta y_T$, are valuable in design of a robust fusion system for lane sensing. They are especially useful in inclement weather and lighting conditions, such as front low-angle sun, partially snow-covered lane markers, reduced visibility due to fog, and the like, where the quality of images from the forward-view camera 12 would be reduced.

Figure 6:
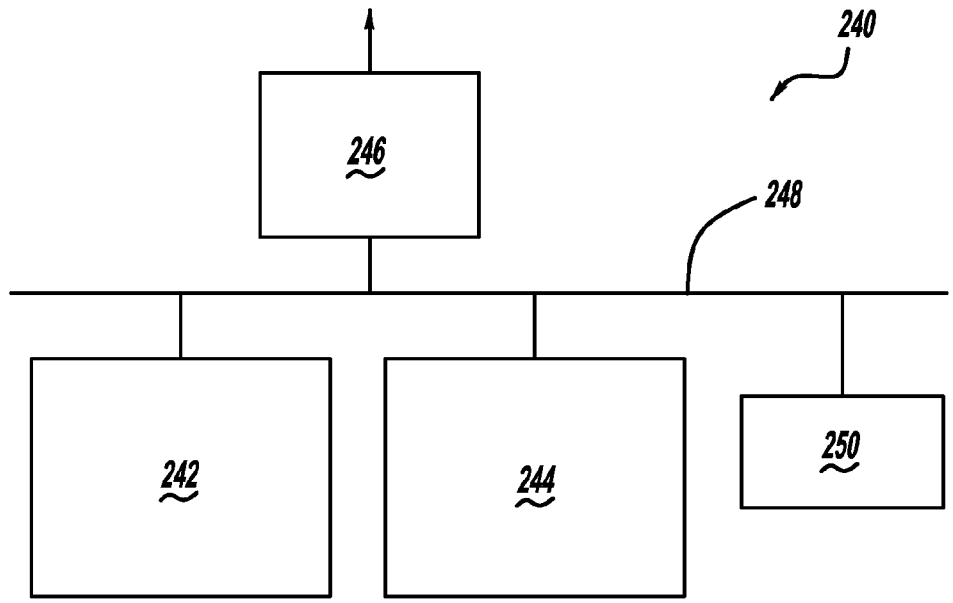
FIG. 6 is a block diagram of a first embodiment of a lane fusion system using input from two cameras.

FIG. 6 is a block diagram of a first embodiment of a lane fusion system 240 using input from two cameras. In the system 240, a full-fledged forward lane sensor system 242 and a full-fledged rear lane sensor system 244 each include a camera and a processor, and can detect and track lane boundaries at their respective ends of the host vehicle 50. The forward lane sensor system 242 and the rear lane sensor system 244 provide their measurements to a lane fusion module 246 which computes enhanced lane boundary and orientation information. The forward lane sensor system 242 sends measurements $\theta_F$, $\Delta y_F$, and κ to the fusion module 246 at a fixed sample rate (e.g., 10 Hz). The rear lane sensor system 244 sends measurements $\theta_T$ and $\Delta y_T$ at the same fixed sample rate. The forward lane sensor system 242, the rear lane sensor system 244, and the fusion module 246 are interconnected by a serial network 248, which may use the Control Area Network (CAN) or other protocol.

The fusion module 246 takes inputs from both the front and rear lane sensor systems 242 and 244, and vehicle dynamic sensors 250, and outputs the enhanced lane information: vehicle orientation with respect to the tangent of the lane (θ), displacement of the front bumper center to the lane boundaries (Δy), and the lane curvature (κ). As mentioned previously, the lane information could be used by various downstream applications.

Let the measurements from the vehicle dynamic sensors 250 include vehicle speed ($v_H$) and yaw rate ($\omega_H$). Then the following Kalman filter is designed to fuse the information from both the front and rear lane sensor systems 242 and 244.

Let the state variables be $s=(\kappa, \theta, \Delta y, \phi_F, \phi_T)$, where $\kappa$, $\theta$ and $\Delta y$ are defined as above; and $\phi_F$ and $\phi_T$ are the azimuth misalignment of the front and rear lane systems 242 and 244, respectively.

The state dynamic equation is written as:

$$\kappa' = \kappa + v_\kappa$$

$$\theta' = \theta - \omega_H \Delta T + \kappa v_H \Delta T + v_\theta$$

$$\Delta y' = \Delta y + v_H \Delta T \theta + v_{\Delta y}$$

$$\phi'_F = \phi_F$$

$$\phi'_R = \phi_R \quad (16)$$

or in short as:

$$s' = Fs + u + Gv \quad (17)$$

where $v=(v_\kappa, v_\theta, v_{\Delta y})^T$ denotes a zero-mean Gaussian white noise vector modeling the uncertainty of the state dynamics model;

$$F = \begin{bmatrix} 1 & 0 & 0 & 0 & 0 \\ v_H \Delta T & 1 & 0 & 0 & 0 \\ 0 & v_H \Delta T & 1 & 0 & 0 \\ 0 & 0 & 0 & 1 & 0 \\ 0 & 0 & 0 & 0 & 1 \end{bmatrix}, u = [0 \quad -\omega_H \Delta T \quad 0 \quad 0 \quad 0]^T,$$

$$\text{and } G = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 0 & 0 \\ 0 & 0 & 0 & 0 & 0 \end{bmatrix}.$$

The measurement model can be written as:

$$\theta_F = \theta + \phi_F + w_{\theta_F}$$

$$\Delta y_F = \Delta y + w_{\Delta y_F}$$

$$\kappa_F = \kappa + w_\kappa$$

$$\theta_T = \theta + \phi_T + w_{\theta_T}$$

$$\Delta y_T = \Delta y + w_{\Delta y_T} \quad (18)$$

or in short as:

$$o = Hs + w \quad (19)$$

$$\text{where } H = \begin{bmatrix} 0 & 1 & 0 & 1 & 0 \\ 0 & 0 & 1 & 0 & 0 \\ 1 & 0 & 0 & 0 & 0 \\ 0 & 1 & 0 & 0 & 1 \\ 0 & 0 & 1 & 0 & 0 \end{bmatrix},$$

$o=[\theta_F \; \Delta y_F \; \kappa_F \; \theta_T \; \Delta y_T]^T$, and $w=[w_{\theta_F} \; w_{\Delta y_F} \; w_\kappa \; w_{\theta_T} \; w_{\Delta y_T}]^T$ is a zero-mean Gaussian white noise vector modeling the quality of the measurements from the front and rear lane sensor systems 242 and 244.

In summary, the following Kalman filtering procedure jointly estimates the misalignment angles and the lane parameters:

1) Randomly choose small numbers to initialize the misalignment parameters $\phi_F(0)$ and $\phi_T(0)$; combining the misalignment parameters with the first measurement from the front lane sensor 242 yields $s(0)=(\kappa_F(0), \theta_F(0), \Delta y_F(0), \phi_F(0), \phi_T(0))^T$, and a covariance matrix P(0) is chosen for s(0).
2) When the new measurement at time instant t arrives, the previous state vector is written as s(t−1); the predicted state at time instant t can be written as $\tilde{s}(t)=Fs(t-1)+u(t)$, and the covariance matrix $\tilde{P}(t)=P(t-1)+GQG^T$, where Q is the covariance matrix of the noise vector v.
3) Let the measurement at time instant t be o; thus the updated state vector at time instant t is:

$$e = o - h(\tilde{s}(t))$$

$$S = H\tilde{P}(t)H^T + R$$

$$K = \tilde{P}(t)H^T S^{-1}$$

$$\hat{s}(t) = \tilde{s}(t) + Ke$$

$$P(t) = (I - KH_t)\tilde{P}(t)$$

where R is the covariance matrix.
4) Output $\hat{s}(t)$ as the fusion output.
5) Go to Step 2.

Using the above procedure, the fusion module 246 of the system 240 computes a combined set of lane parameters for the host vehicle 50, while simultaneously determining the misalignment parameters for the front and rear lane sensor systems 242 and 244.

Figure 7:
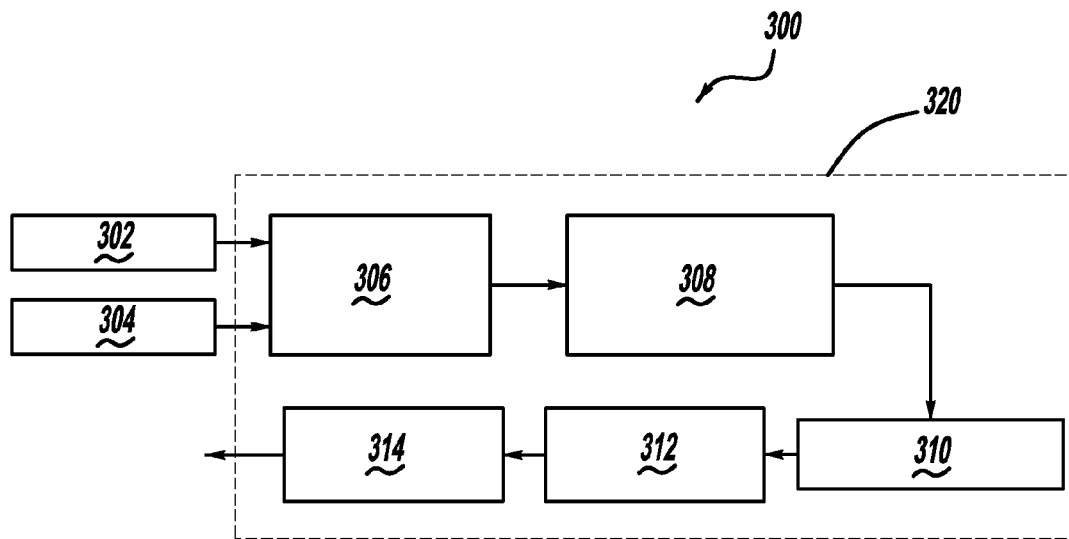
FIG. 7 is a block diagram of a second embodiment of a lane fusion system using input from two cameras.

FIG. 7 is a block diagram of a second embodiment of a lane fusion system 300 using input from two cameras. The system 300 does not include full-fledged lane sensor systems at the front and rear. Instead, the system 300 includes a forward-view camera 302 and a rear-view camera 304. The cameras 302 and 304 only capture images and send them to a fusion module 320, which combines both images together, detects and tracks the lane markers.

Images from the forward-view and rear-view cameras 302 and 304, respectively, are provided to box 306 to find local high intensity regions. The key idea of the box 306 is to find stable local high-intensity regions in different spatial scales. The algorithm begins with building a Gaussian pyramid. At each pyramid scale, the image is subtracted by the enlarged coarse-level image, which is further blurred. Then the local maximum finding operation is applied to the difference images at different scales, and all maxima whose height is less than a threshold h are suppressed. Thus the binary images of possible lane markers are derived at the box 306.

At box 308, the detected pixels of curbs and stripes are projected onto ground plane in the vehicle coordinate system based on the camera calibration parameters. At box 310, point clouds of the projected pixels from the box 308 are first clustered based on the similarity measure (distance). Close pixels are clustered into a single component. Then the components are classified based on their geometry shape. Components whose shape matches with curbs and lane stripes are selected, and then line fitting and arc fitting procedures are applied to fit the stripe candidates. The components whose shape do not match with a line or an arc are discarded.

At box 312, the fitted stripes in vehicle coordinate system are then linked into a lane boundary. At box 314, lane information is tracked and output. This includes: monitoring the fitted stripes and data from vehicle dynamic sensors; tracking the lane boundary; and estimating lane information, including the lane curvature (κ), the vehicle orientation with respect to the tangent of the lane (θ), and the displacement of the front bumper center to the lane boundaries (Δy). Details of the algorithms used in the boxes 308-314 are given below.

The projection algorithm of the box 308 requires the following camera intrinsic parameters:
Focal length: The focal length in pixels, $[f_u, f_v]$;
Optical center: $[c_u, c_v]$;
Skew coefficient: The skew coefficient defining the angle between the x and y pixel axes is stored in the scalar $\alpha_c$;
Distortions: The image distortion coefficients (radial and tangential distortions) are stored in the vector $k_c = (k_1, k_2, k_3, k_4, p_1, p_2)$, where $(k_1, k_2, k_3, k_4)$ is radial distortion coefficients and $(p_1, p_2)$ is tangential coefficients;
and camera extrinsic parameters:
Translation vector T;
Rotation matrix R;

The camera extrinsic parameters are estimated through a camera calibration process, many of which are known in the art, and which need not be discussed here.

An iterative procedure used to remove the distortion is outlined below. The input includes a set of pixels $S=\{(u_i, v_i)|i=1, \ldots, N\}$ and the above-defined camera intrinsic parameters. The output is the rectified set of pixels $S'=\{(u'_i, v'_i)|i=1, \ldots, N\}$. The procedure is as follows:
1) For each pixel $s_i=(u_i, v_i)$, i=1, ... N;
2) Iteratively execute the following steps 20 times:
   a. Let
$$u = \begin{bmatrix} u_i \\ v_i \end{bmatrix}$$
and $r=\|x\|$.
   b. Compute radial correction:
$$k_{rad} = 1 + k_1 r + k_2 r^2 + k_3 r^3 + k_4 r^4.$$
   c. Compute tangential correction:
$$\Delta u = \begin{bmatrix} 2p_1 u_i v_i + p_2(r^2 + 2u_i^2) \\ p_1(r^2 + 2v_i^2) + 2p_2 u_i v_i \end{bmatrix}.$$
   d. Correct the pixel $u=(u+\Delta u)/k_{rad}$.
3) Output u as the final corrected pixel $(u'_i, v'_i)$.

After the above rectification, or distortion removing process, the following transformation can be applied. The input includes a set of rectified pixels $S'=\{(u'_i, v'_i)|i=1, \ldots, N\}$ and the camera extrinsic parameters described above. The output is the detected lane marker points projected onto the vehicle frame: $X=\{(x_i, y_i)|i=1, \ldots, N\}$. The transformation process is as follows:
1) For each pixel $s_i=(u_i, v_i)$, i=1, ..., N;
   a. Let $u = \begin{bmatrix} u'_i \\ v'_i \end{bmatrix}$ and $K_K = \begin{bmatrix} f_u & \alpha_c f_u & c_u \\ 0 & f_v & c_v \\ 0 & 0 & 1 \end{bmatrix}$.
   b. Compute $P=K_k[R\ T]$.
   c. Let $H=[p_1\ p_2\ p_4]$ where $p_j$, j=1, ..., 4 is the column vector.
   d. Compute $z=H^{-1}u$.
2) Output z as the projected pixel $(x_i, y_i)$ in ground plane in vehicle frame.

The above rectification and transformation procedures are applied at the box 308 to provide a set of highlighted pixels, that is, points that are candidate curb or lane stripe points, in the vehicle coordinate frame. Then, at the box 310, the pixels or points are clustered together into curbs and lane stripes. Given the lane marker pixel set $$X = \left\{ z_i \mid z_i = \begin{bmatrix} x_i \\ y_i \end{bmatrix} \right\},$$

i=1, ... N}, the pixels are first clustered into stripes and then the stripes are fit into line or arc segments.

First, in order to cluster adjacent pixels into a stripe, a similarity graph G=(V, E) is constructed where the vertex set is defined as the pixels on ground, i.e., $V=\{z_i|i=1, \ldots N\}$ and the edge set E is defined as a set of pixel pairs if each pixel pair's distance on the ground plane is less than a threshold ($T_{sep}$), or each pixel pair is in 8-neighbor proximity of each other in the image plane, i.e., $E=\{(z_i,z_j)|\|z_i-z_j\|<T_{sep} \vee \text{Neighbor}(s_i,s_j)\}$, where $s_i$ and $s_j$ are the corresponding locations in the image plane; and Neighbor($s_i,s_j$) is true if $s_i$ and $s_j$ are in 8-neighbor proximity of each other. In this clustering methodology, 8-neighbor proximity means that a second pixel is one of the 8 nearest neighbors (immediately left, right, above, below, above-left, above-right, below-left, or below-right) of a first pixel, in an approximately rectangular grid of pixels.

Next a depth-first search (DFS) strategy is applied to partition the graph into connected components: $\{X_1, \ldots, X_c\}$. Then each of the clustered stripes is fitted with a line or an arc.

Let $z_i=(x_i, y_i)$, i=1 ..., $N_c$ be a pixel in a detected stripe. The stripe can be fitted by a line parametric equation (Ax+By=d, such that $A^2+B^2=1$). The parameters A, B and d can be estimated via least-squares, such as minimizing:

$$\|D\beta\|^2, D = \begin{pmatrix} x_1 & y_2 & 1 \\ x_2 & y_2 & 1 \\ \vdots & \vdots & \vdots \\ x_{N_c} & y_{N_c} & 1 \end{pmatrix}, \beta = \begin{pmatrix} A \\ B \\ d \end{pmatrix} \quad (20)$$

which can be solved by finding the eigenvector of X with the smallest eigenvalue $\lambda_m$:

$$D\beta = \lambda_m \beta \quad (21)$$

The fitting residue is defined as $e=\lambda_m$.
The width W and length L of the stripe are computed as:

$$W = \max_i(z_i^T n) - \min_i(z_i^T n), L = \max_i(z_i^T t) - \min_i(z_i^T t) \quad (22)$$

respectively, where n and t are the normal and tangential vectors (unit length) of the line segment, i.e., $$n = \begin{bmatrix} \frac{A}{r} & \frac{B}{r} \end{bmatrix} \text{ and } d' = \frac{d}{r} \text{ with } r = \sqrt{A^2 + B^2}.$$

Then t is derived by rotating n by 90 degrees.
The two endpoints of the stripe are:

$$e_s = z_m - (n^T z_m - d')n \quad (23)$$
$$e_e = z_M - (n^T z_M - d')n$$

where indices $m = \underset{i=1,\ldots,N_c}{\operatorname{argmin}}(z_i^T t)$ and $M = \underset{i,1,\ldots,N_c}{\operatorname{argmax}}(z_i^T t)$.

The orientation (angle) of the stripe is $\phi = a\tan 2 (A, B)$.
If the residue of line fitting is larger than a threshold, the stripe is fit again using a circle parametric equation ($x^2+y^2+$ $a_1x+a_2y+a_3=0$). The parameters $a_1$, $a_2$, and $a_3$ can be estimated via least-squares, such as minimizing:

$$\|C\alpha - b\|^2, C = \begin{bmatrix} x_1 & y_1 & 1 \\ x_2 & y_2 & 1 \\ \vdots & \vdots & \vdots \\ x_{N_c} & y_{N_c} & 1 \end{bmatrix}, \quad (24)$$

$$b = \begin{bmatrix} -(x_1^2 + y_1^2) \\ -(x_2^2 + y_2^2) \\ \vdots \\ -(x_{N_c}^2 + y_{N_c}^2) \end{bmatrix}, \alpha = \begin{bmatrix} a_1 \\ a_2 \\ a_3 \end{bmatrix}$$

with respect to $\alpha$.

The solution of the above least squares is $\alpha=(C^TC)^{-1}C^Tb$. The radius and center of the fitted circle can be written as:

$$R = (a_1^2 + a_2^2)/4 - a_3 \quad (25)$$

$$x_c = -\frac{a_1}{2}$$

$$y_c = -\frac{a_2}{2}$$

respectively.

The two endpoints of the fitted arc can be computed as:

$$e_s = [x_c + R\cos\phi_m, y_c + R\sin\phi_m]^T$$

$$e_e = [x_c + R\cos\phi_M, y_c + R\sin\phi_M]^T \quad (26)$$

and the stripe's orientation (angle) at the endpoints are $\phi_s = \phi_m$ and $\phi_e = \phi_M$, where the indices $$m = \underset{i=1,\ldots,N_c}{\mathrm{argmin}}(\mathrm{atan}(y_i - y_c, x_i - x_c))$$

and $$M = \underset{i=1,\ldots,N_c}{\mathrm{argmax}}(\mathrm{atan}(y_i - y_c, x_i - x_c)).$$

The width W and length L of the stripe are computed as follows:

$$W = \max(\|z_i - c\|) - \min(\|z_i - c\|) \quad (27)$$

and $$L = \|e_s - e_e\| \quad (28)$$

respectively, where $c=[x_c\ y_c]^T$ denotes the center of the circle.

In summary, the output of the box 310 is a list of stripes fitted with line segments with the following parameters; normal vector (n), distance to the origin (d'), width (W), length (L), orientation ($\phi$), and start points ($e_s$); or arc segments with the following parameters; the center of the circle (c), radius (R), width (W), length (L), and two end points' positions ($e_s$ and $e_e$).

Figure 8:
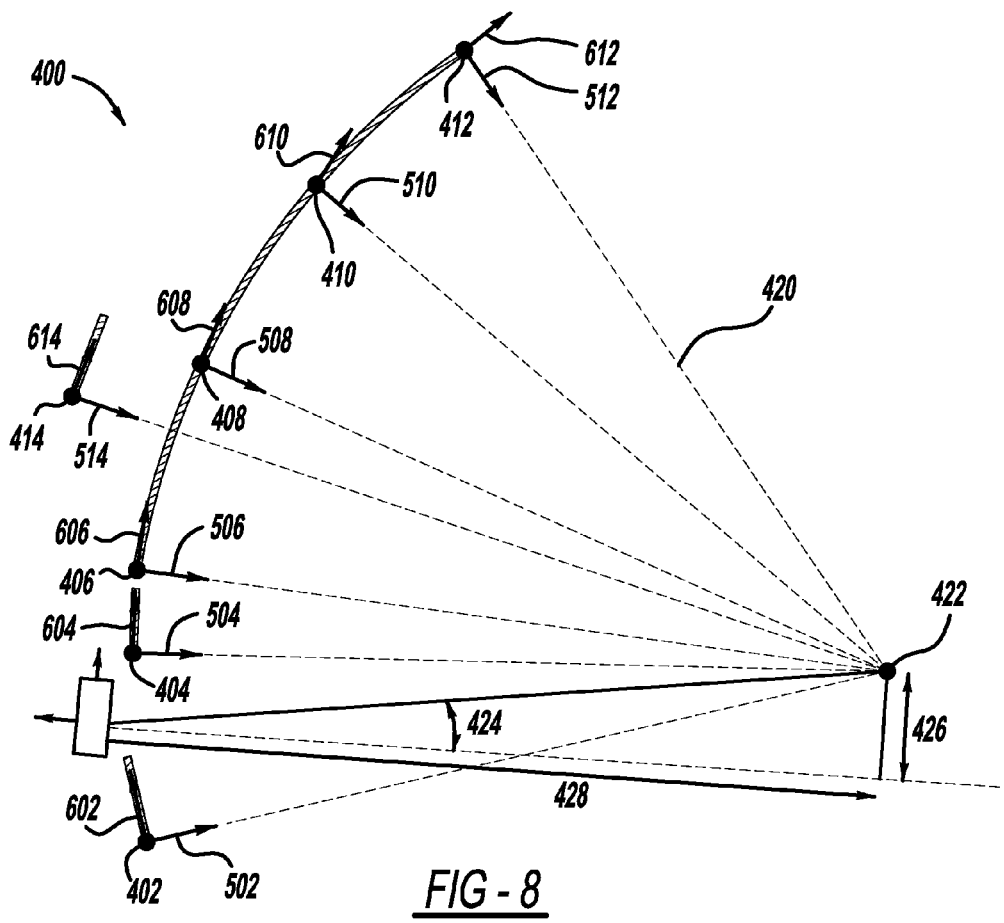
FIG. 8 is a diagram which shows an example of lane stripe representation for a scenario where several short stripes and one long arc have been detected.

FIG. 8 is a diagram 400 which shows an example of lane stripe representation for a scenario where the following have been detected: line segment #1 represented by end point 402 and normal vector 502, line segment #2 (404, 504), line segment #3 (414, 514), and arc segment with radius 420, center (c) 422, first end point 406, and second end point 412.

The following steps are used at the box 312 to link the stripes into left and right lane boundaries.

First, any stripe whose aspect ratio (L/W) is less than a threshold is removed. Only slim stripes are kept for further processing. Then long arc or line segments are broken down into short segments, and each segment is represented by a start end point (e) and a tangential vector (t). For example, in the diagram 400, the start end point and tangential vector for line segment #1 are represented as (402, 602); and the long arc is broken up into four end points: (406, 606), (408, 608), (410, 610), and (412, 612).

To estimate the overall lane geometry information at the box 314 (i.e., the lane curvature κ, the vehicle's orientation with respect to the lane tangent θ, and the displacement to lane boundaries Δy), an estimate is needed for the position of center c.

Given a set of stripe segments $\{(e_k,t_k)|k=1,\ldots,K\}$. For each segment, $(e_k,t_k)$ there is a normal (dashed lines in the diagram 400) passing through c, i.e., $t_k^T(c-e_k)=0$. Let $t_k=(t_{xk}, t_{yk})$. Therefore, finding c is equivalent to minimizing the following least squares:

$$\|Ec - \gamma\|, E = \begin{bmatrix} t_{x1} & t_{y1} \\ t_{x2} & t_{x2} \\ \vdots & \vdots \\ t_{xK} & t_{yK} \end{bmatrix}, \gamma = \begin{bmatrix} t_1^T e_1 \\ t_2^T e_2 \\ \vdots \\ t_K^T e_K \end{bmatrix} \quad (29)$$

The solution of the above least squares is $c=(E^TE)^{-1}E^T\gamma$. The curvature of the lane can be written as:

$$\kappa = \begin{cases} \dfrac{1}{\|c\|} & \text{if } c \text{ is on left side} \\ -\dfrac{1}{\|c\|} & \text{otherwise.} \end{cases} \quad (30)$$

The vehicle's orientation with respect to the lane tangent can be computed as:

$$\theta = a\tan 2(c_x, c_y) \quad (31)$$

where $c_x$ is shown as dimension 426 and $c_y$ is shown as dimension 428 in the diagram 400.

Figure 9:
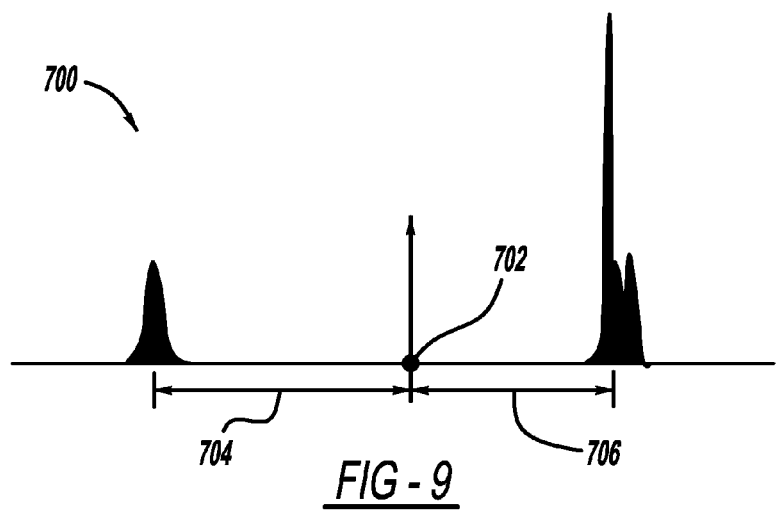
FIG. 9 is a histogram which shows how the displacement of the host vehicle to the lane boundaries can be computed.

FIG. 9 is a histogram 700 which shows an example of how the displacement to the lane boundaries can be computed. Let $\{z_j|j=1,\ldots,M\}$ denote the pixels of detected lane stripes. The histogram 700 is constructed which graphs the distance to the center c for all of these pixels (i.e., $d_j=\|z_j-c\|, j=1,\ldots,M$). The histogram 700 has an origin point 702.

Displacement to left lane boundary $y_L$ is distance 704 from the origin point 702 to the left local peak in the histogram 700, while displacement to right lane boundary $y_R$ is distance 706 from the origin point 702 to the right local peak.

Equations (29)-(31) estimate the lane using data from a single frame from the cameras 302 and 304. The method can be extended to include tracking and data from vehicle dynamic sensors. Two such methods are proposed. For both methods, the state variables are defined as $s=(\kappa, \theta, \Delta y)$ where the variables are defined as the lane curvature (κ), vehicle orientation with respect to the tangent of the lane (θ), and displacements to the lane boundaries (Δy), respectively. Let the vehicle speed ($v_H$) and yaw rate ($\omega_H$) denote measurements from the vehicle dynamic sensors.

For the first method, a Kalman tracking procedure is used to estimate the lane parameters. FIG. 10 is a flow chart diagram 800 of the Kalman tracking method. The steps are as follows:

1) At box 802, initialize the state vector s(0) with first measurement from the system 300 (Equations (29)-(31)), and choose a covariance matrix P(0) for s(0).
2) Wait at decision diamond 804 for new data to arrive; when the new measurement at time instant t arrives, at box 806 write the previous state vector as s(t−1); then at box 808 the predicted state s(t) at time instant t can be written as:

$$\kappa' = \kappa$$

$$\theta' = \theta - \omega_H \Delta T + \kappa v_H \Delta T$$

$$\Delta y' = \Delta y + v_H \Delta T \theta$$

where $\Delta T$ is the time increment, and the projected state vector $s'(t) = [\kappa' \; \theta' \; \Delta y']$.

3) Also at the box 808, the circle center is computed as:

$$c' = \left[ \frac{1}{\kappa'} \sin\theta' \quad \frac{1}{\kappa'} \cos\theta' \right].$$

4) At box 810, the detected stripes $(e_k, t_k)$ from the cameras 302 and 304 are provided; then at box 812, a gating operation is performed to identify outliers of the detected stripes, using the following criteria:

$$\frac{|(e_k - c')^T t_k|}{\|e_k - c'\|} < T$$

where T is a threshold value; a stripe will be treated as an outlier if the above is not true.

5) At box 814, compute the current lane geometry information; for all stripes remaining after the gating of the box 812, the least squares are minimized using Equation (29) to find the solution for the updated center $\hat{c}$; then $\kappa_m$ and $\theta_m$ are computed through Equations (30)-(31), respectively, and displacements $\Delta y_m$ through building the histogram.

6) At box 816, perform a measurement correction; treat $\kappa_m$, $\theta_m$, and $\Delta y_m$ as the direct measurement of the state variables; the following measurement equations can be written:

$$\theta_m = \theta + w_{\theta_m}$$

$$\Delta y_m = \Delta y + w_{\Delta y_m}$$

$$\kappa_m = \kappa + w_{\kappa_m}$$

where $(w_{\theta_m} \; w_{\Delta y_m} \; w_{\kappa_m})^T$ is a zero-mean white Gaussian noise vector, whose covariance matrix is a function of the residue in the least squares minimization of Equation (29); then a Kalman filter is applied to the obtain the final output s(t) and the corresponding covariance matrix P(t).

7) At box 818, output the updated lane geometry information, and go back to the decision diamond 804.

The Kalman tracking procedure described above and on the flow chart diagram 800 represents the first method for computing lane curvature and vehicle orientation information, using images from the forward-view and rear-view cameras 302 and 304 and data from vehicle dynamics sensors. The second method uses a particle filter. FIG. 11 is a flow chart diagram 900 showing the particle filter method, which uses the following steps to compute the lane parameters:

1) At box 902, initialize the state vector s(0) with a set of particles (random sample of geometry information): $\{(s_i(0), w_i) | i=1, \ldots, M\}$ and the weight $$w_i = \frac{1}{M},$$

for $i=1, \ldots, M$.

2) Wait at decision diamond 904 for new data to arrive; when the new measurement data at time instant t arrives, for each of the particles, $\kappa_m$, $\theta_m$ and $\Delta y_m$ are calculated using the steps 2) to 5) of the Kalman tracker; that is;
   a. At box 906, write the previous state vector as s(t−1).
   b. At box 908, calculate the predicted state s(t); also compute the circle center c'.
   c. At box 910, provide detected stripes from both cameras; at box 912, perform a gating operation to identify outlier stripes.
   d. At box 914, compute the current lane geometry information using Equations (29)-(31) and the histogram.

3) Then the value of the i-th particle becomes $s'_i(t) = (\kappa_m, \theta_m, \Delta y_m)$; let $\Delta_i$ denote the residue of the estimation for the i-th particle; at box 916, compute the new weight of the particle as $$w'_i = \exp\left(-\frac{\Delta_i^2}{2\sigma}\right),$$

where $\sigma$ is a predefined constant.

4) At box 918, compute the weighted average of the particle set $\hat{s}(t)$ as:

$$\hat{s}(t) = \Sigma_{i=1}^M s_i(t) w_i / \Sigma_{i=1}^M w_i$$

and output $\hat{s}(t)$.

5) At box 920, apply importance re-sampling, a standard statistical procedure, to the updated particle set as $\{(s'_i(t), w'_i) | i=1, \ldots, M\}$; this yields a set of random samples of the updated lane geometry information at box 922.

6) Go to Step 2, the decision diamond 904.

As described above and shown on the flow chart diagrams 800 and 900, either the Kalman filter method or the particle filter method can be used to compute the lane geometry information—the lane curvature $\kappa$, the vehicle's orientation with respect to the lane tangent $\theta$, and the displacement to lane boundaries $\Delta y$—using images from the forward-view and rear-view cameras 302 and 304, and vehicle dynamics sensors, as input. The resultant lane geometry information can be used by downstream applications, such as a lane departure warning system.

The methods and systems disclosed herein, by using the image data available from a rear-view camera, and combining it with image data from a forward-view camera and other sensors, provide more robust capability for lane sensing or lateral control. The two-camera system not only makes use of more input data under normal conditions, but also provides a usable source of image data to allow operation of the system when conditions are unfavorable for forward-view imaging. Vehicle manufacturers and consumers can benefit from these systems, which take advantage of existing rear-view imaging capability in many vehicles to offer improved system performance and reliability, while incurring no new hardware-related costs.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a vehicle's position in a lane, said method comprising:
providing data from a forward-view camera module onboard the vehicle;
providing data from a rear-view camera module onboard the vehicle;
providing data from vehicle dynamics sensors onboard the vehicle; and
fusing the data from the forward-view camera module, the rear-view camera module, and the vehicle dynamics sensors into a combined set of lane geometry information to determine the vehicle's position in the lane, including using a Kalman filter routine to jointly estimate the lane geometry information and misalignment angles of the forward-view camera module and the rear-view camera module, where the Kalman filter routine includes lane curvature, vehicle tangent angle to the lane, front bumper displacement to a lane boundary, and azimuth misalignment angles of the forward-view camera module and the rear-view camera module as state vector variables and simultaneously solves for all of the state vector variables.

2. The method of claim 1 wherein the lane geometry information includes lane curvature, vehicle orientation with respect to a tangent to the lane, and displacements to left and right lane boundaries.

3. The method of claim 1 wherein providing data from a forward-view camera module includes providing front lane geometry information from a front full-fledged lane sensing system, and providing data from a rear-view camera module includes providing rear lane geometry information from a rear full-fledged lane sensing system.

4. The method of claim 1 wherein providing data from a forward-view camera module includes providing forward image data from a front camera, and providing data from a rear-view camera module includes providing rear image data from a rear camera.

5. The method of claim 4 wherein fusing the data from the forward-view camera module, the rear-view camera module, and the vehicle dynamics sensors includes finding high intensity pixels in the forward image data and the rear image data, projecting the high intensity pixels onto a vehicle coordinate frame, detecting curbs and lane stripes from the high intensity pixels, linking the curbs and lane stripes into the lane, and tracking the lane geometry information.

6. The method of claim 4 wherein fusing the data from the forward-view camera module, the rear-view camera module, and the vehicle dynamics sensors includes using a Kalman filter.

7. The method of claim 4 wherein fusing the data from the forward-view camera module, the rear-view camera module, and the vehicle dynamics sensors includes using a particle filter.

8. The method of claim 5 wherein finding high intensity pixels in the forward image data and the rear image data includes using a Gaussian pyramid routine, where binary images at different spatial scales are subtracted from each other.

9. The method of claim 5 wherein projecting the high intensity pixels onto a vehicle coordinate frame includes using an iterative procedure to remove radial and tangential distortion, and a rotational and translational transformation procedure, to produce a plurality of high intensity pixels in the vehicle coordinate frame.

10. The method of claim 5 wherein detecting curbs and lane stripes from the high intensity pixels includes using a similarity graph and depth-first search routine, which clusters neighboring high intensity pixels into stripes.

11. The method of claim 10 wherein detecting curbs and lane stripes from the high intensity pixels also includes fitting the stripes with a line segment or an arc using a least-squares routine.

12. The method of claim 5 wherein linking the curbs and lane stripes into the lane includes finding a center of curvature of the lane using a least-squares routine applied to the curbs and lane stripes.

13. The method of claim 12 wherein tracking the lane geometry information includes computing displacements to left and right lane boundaries using a histogram routine, and computing lane curvature and vehicle orientation with respect to a tangent to the lane using the center of curvature.

14. A method for determining a vehicle's position in a lane, said method comprising:
providing image data from a forward-view camera onboard the vehicle;
providing image data from a rear-view camera onboard the vehicle; and
fusing the image data from the forward-view camera and the rear-view camera into a combined set of lane geometry information to determine the vehicle's position in the lane, including using a Kalman filter routine to jointly estimate the lane geometry information and misalignment angles of the forward-view camera and the rear-view camera, where the Kalman filter routine includes lane curvature, vehicle tangent angle to the lane, front bumper displacement to a lane boundary, and azimuth misalignment angles of the forward-view camera and the rear-view camera as state vector variables and simultaneously solves for all of the state vector variables.

15. The method of claim 14 wherein fusing the data from the forward-view camera and the rear-view camera includes finding high intensity pixels in the image data, projecting the high intensity pixels onto a vehicle coordinate frame, detecting curbs and lane stripes from the high intensity pixels, linking the curbs and lane stripes into the lane, and tracking the lane geometry information.

16. The method of claim 14 wherein the lane geometry information includes lane curvature, vehicle orientation with respect to a tangent to the lane, and displacements to left and right lane boundaries.

17. A system for determining a vehicle's position in a lane, said system comprising:
a first camera for capturing images of a forward view from the vehicle;
a second camera for capturing images of a rear view from the vehicle; and
a processor configured to receive the images from the first and second cameras and compute lane geometry information using a fusion of the images from the first and second cameras, including using a Kalman filter routine to jointly estimate the lane geometry information and misalignment angles of the first camera and the second camera, where the Kalman filter routine includes lane curvature, vehicle tangent angle to the lane, front bumper displacement to a lane boundary, and azimuth misalignment angles of the first camera and the second camera as state vector variables and simultaneously solves for all of the state vector variables.

18. The system of claim 17 wherein the processor finds high intensity pixels in the images from the first and second cameras, projects the high intensity pixels onto a vehicle coordinate frame, detects curbs and lane stripes from the high intensity pixels, links the curbs and lane stripes into the lane, and tracks lane geometry information.

19. The method of claim 17 wherein the lane geometry information includes lane curvature, vehicle orientation with respect to a tangent to the lane, and displacements to left and right lane boundaries.

* * * * *